United States Patent
Singh et al.

(10) Patent No.: US 12,044,820 B2
(45) Date of Patent: Jul. 23, 2024

(54) PEST DETECTION SYSTEMS AND METHODS

(71) Applicant: FarmSense, Inc., Riverside, CA (US)

(72) Inventors: Shailendra Singh, Riverside, CA (US); Christopher Verdegan, Riverside, CA (US)

(73) Assignee: FarmSense, Inc., Riverside, CA (US)

( * ) Notice: Subject to any disclaimer, the term of this patent is extended or adjusted under 35 U.S.C. 154(b) by 260 days.

(21) Appl. No.: 17/747,855

(22) Filed: May 18, 2022

(65) Prior Publication Data
US 2023/0341584 A1    Oct. 26, 2023

Related U.S. Application Data

(63) Continuation of application No. 17/728,753, filed on Apr. 25, 2022.

(51) Int. Cl.
*G01V 8/20* (2006.01)
(52) U.S. Cl.
CPC ................................. *G01V 8/20* (2013.01)

(58) Field of Classification Search
CPC ........................................................ G01V 8/20
See application file for complete search history.

(56) References Cited

U.S. PATENT DOCUMENTS

| | | | |
|---|---|---|---|
| 2012/0024427 A1* | 2/2012 | Gass | B23Q 11/0092 144/427 |
| 2017/0055511 A1* | 3/2017 | Mafra-Neto | A01M 1/20 |
| 2023/0341583 A1* | 10/2023 | Singh | G01V 8/20 |

* cited by examiner

*Primary Examiner* — David P Porta
*Assistant Examiner* — Meenakshi S Sahu
(74) *Attorney, Agent, or Firm* — Sean Lynch; Lynch LLP

(57) ABSTRACT

The inventive subject matter is directed to pest detection systems that implement infrared emitters with detectors that look for variations in incident light indicative of wingbeats from various pests. Emitters and detectors are placed on one or more printed circuit boards such that infrared light projected from an emitter can be received by one or more detectors. Based on signal generated by a detector, systems of the inventive subject matter can determine whether a pest has flown between an emitter and detector. To save on power, emitter, detectors, or both can be driven by pulse width modulation. Methods of the inventive subject matter are directed to determining pest presence via signal filtering and interpretation.

20 Claims, 8 Drawing Sheets

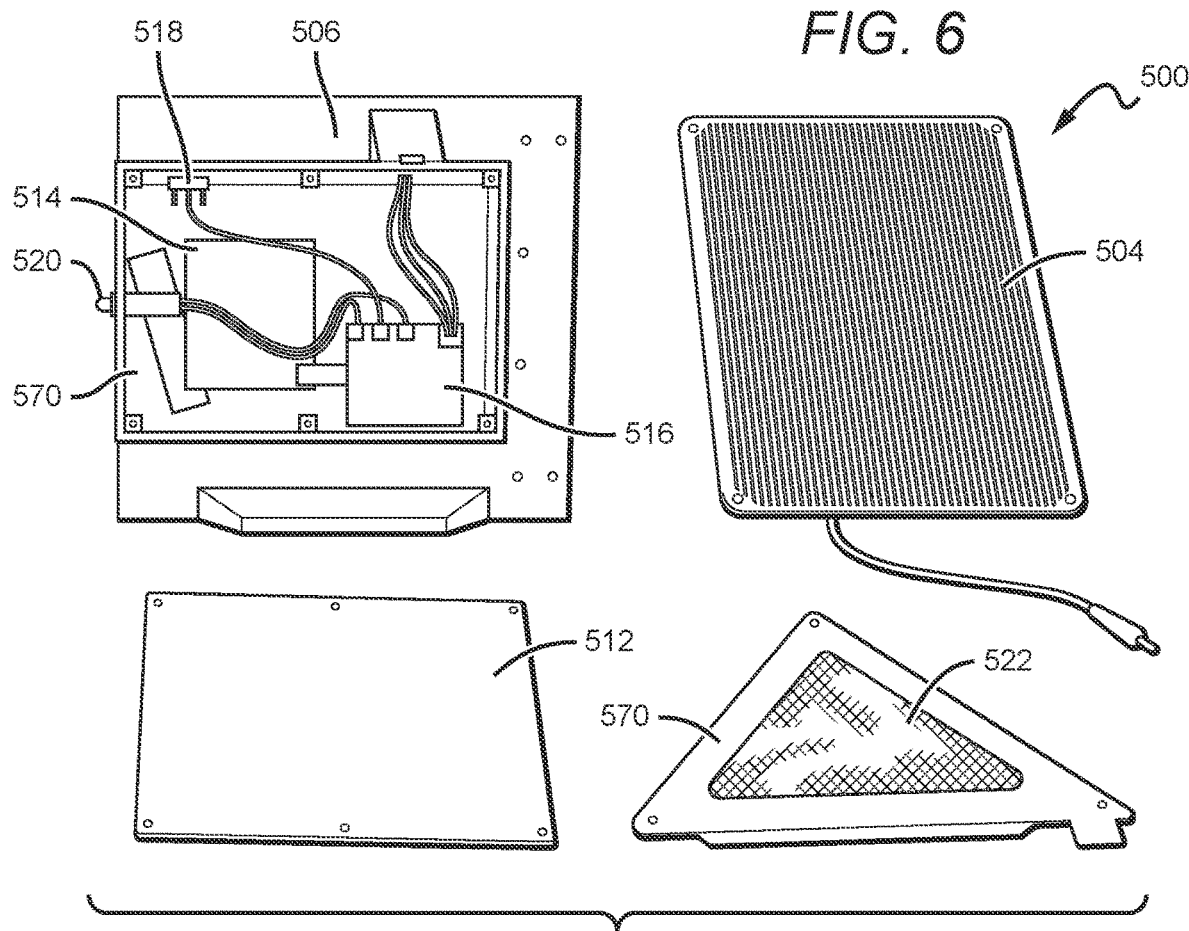
FIG. 6
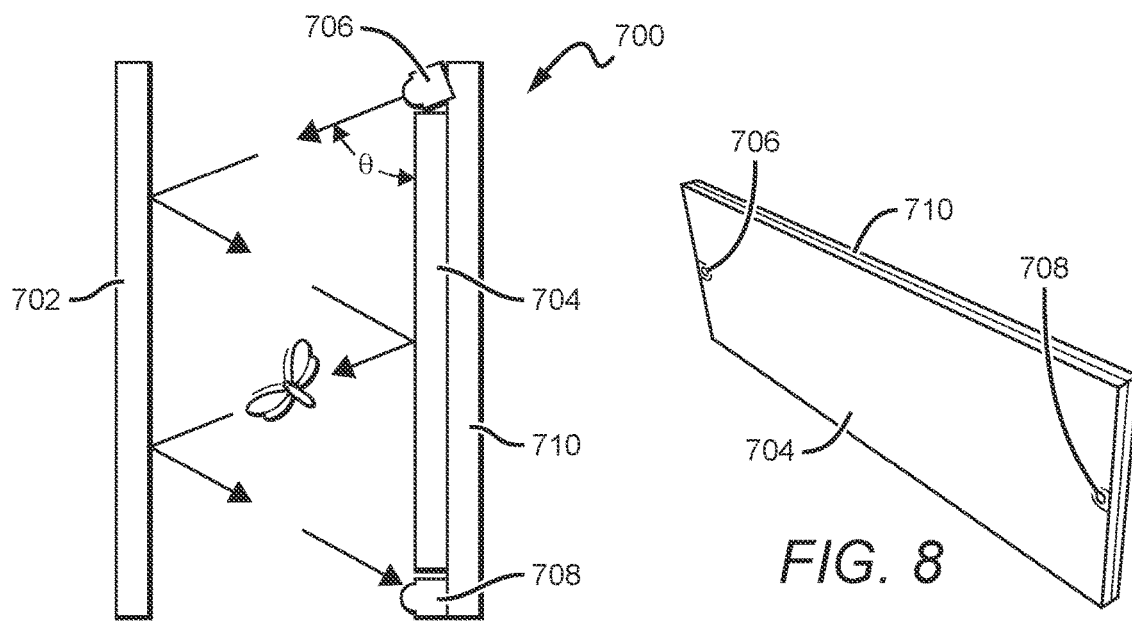
FIG. 7
FIG. 8

PEST DETECTION SYSTEMS AND METHODS

This application claims priority to U.S. patent application Ser. No. 17/725,753, filed Apr. 25, 2022. All extrinsic materials identified in this application are incorporated by reference in their entirety.

FIELD OF THE INVENTION

The field of the invention is light-based pest detection systems and methods.

BACKGROUND

The background description includes information that may be useful in understanding the present invention. It is not an admission that any of the information provided in this application is prior art or relevant to the presently claimed invention, or that any publication specifically or implicitly referenced is prior art.

Farming is simultaneously one of humanity's most ancient enterprises while also remaining one of humanity's most critical enterprises. Efforts throughout human history have been made to minimize effects of pests and disease, to increase the health and nutritional content of food, and to increase crop yields. When it comes to increasing crop yields, pest detection is critically important. Pests tend to be the biggest threat to successful crop production, and, depending on crop type and growth stage, early pest detection can reduce yield loss by up to 20-40% by some estimates.

Past pest detection required farmers to walk their fields to visually inspect for pests that can harm crops. But with industrialization, farmland has grown in acreage to such a degree that walking a farm is impractical. Indeed, even driving around a farm is impractical as it nevertheless requires farmers to spend inordinate amounts of time on a menial task. Thus, efforts have been made to develop automated pest detection systems.

In some efforts, visual detection systems have been developed. But these systems are imperfect. In a visual detection system, a camera is implemented to periodically take pictures or record video of pests that are, e.g., attracted into a trap. But many of these systems still require a human operator to review images in pursuit of pest detection, requiring that human user to, e.g., count a number of pests caught in a trap. Acoustic pest detection has also been implemented, where electromechanical listening devices are used to determine when a pest flies across some threshold by listening for increased noise levels associated with various pests.

But these systems all fall shorts in terms of, e.g., power consumption, accuracy, elimination of a need for human review, and so on. Thus, it has yet to be appreciated that pest detection can be accomplished using infrared light via systems designed to automatically detect wingbeat frequencies associated with flying pests.

SUMMARY OF THE INVENTION

The present invention provides apparatuses, systems, and methods directed to pest detection using infrared light. In one aspect of the inventive subject matter, a pest detection system includes: a first printed circuit board (PCB) portion and a second PCB portion, where a space exists between the first PCB portion and the second PCB portion; at least one emitter disposed on the first PCB portion; at least one detector disposed on the second PCB portion, where the at least one emitter is oriented to face the at least one detector and where the at least one detector is oriented to face the at least one emitter; a pulse width modulation controller configured to drive at least one of the at least one emitter and the at least one detector.

In some embodiments, the first PCB portion and the second PCB portion are part of a single PCB, and in some embodiments the single PCB is V-shaped having a first arm and a second arm where the first arm includes the first PCB portion, and the second arm includes the second PCB portion. The single PCB is annular having a first side and a second side, where the first side includes the first PCB portion, and the second side comprises the second PCB portion. In some embodiments, the pulse width modulation controller operates with a duty cycle between 10% and 90% and with a frequency greater than 240 Hz. The at least one detector can include a photodiode, and the at least one emitter can be configured to project infrared light (e.g., at a wavelength of 700 nm-1,400 nm). In some embodiments, the least one detector is configured to detect infrared light (e.g., between 700 nm-1,400 nm in wavelength).

In another aspect of the inventive subject matter, a pest detection system includes: a first printed circuit board (PCB) portion and a second PCB portion, where a space exists between the first PCB portion and the second PCB portion; a wide-angle emitter disposed on the first PCB portion; a set of detectors disposed on the second PCB portion, where the wide-angle emitter is oriented to face the set of detectors and where each detector in the set of detectors is oriented to face the wide-angle emitter; and a pulse width modulation controller configured to drive the wide-angle emitter and the detector.

In some embodiments, the first PCB portion and the second PCB portion are part of a single PCB, and the pulse width modulation controller can be configured to operate with a duty cycle between 10% and 90% and with a frequency greater than 240 Hz. Each detector in the set of detectors can be a photodiode, and the wide-angle emitter can be configured to project infrared light (e.g., between 700 nm-1,400 nm in wavelength). Each detector in the set of detectors can be similarly configured to detect infrared light (e.g., between 700 nm-1,400 nm in wavelength).

One should appreciate that the disclosed subject matter provides many advantageous technical effects including an ability to detect the presence of pests while discarding false positives with improve accuracy over existing systems.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWING

FIG. 6 shows components of the housing.

FIG. 7 shows a reflective pest detection system.

FIG. 8 shows a perspective view of a part of the reflective pest detection system.

DETAILED DESCRIPTION

Figure 1:
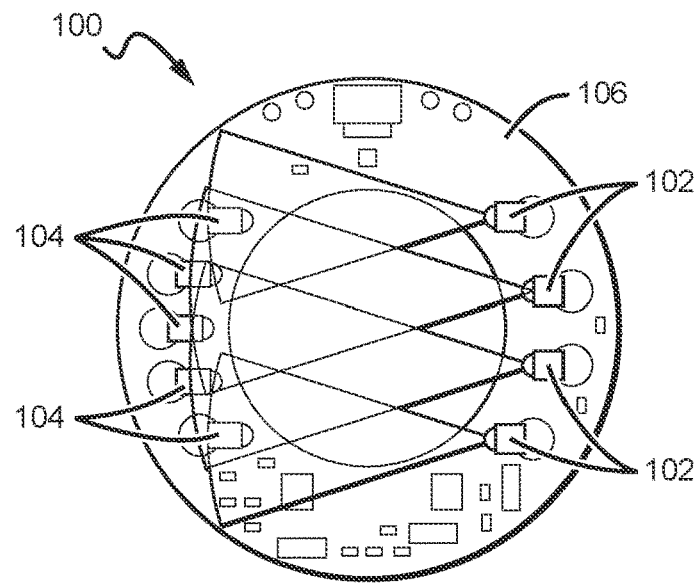
FIG. 1 shows an annular pest detection system.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Embodiments of the inventive subject matter are generally directed to pest detection via electromagnetic radiation emission and detection. When a pest, e.g., a fly passes between an emitter and a corresponding detector, the fly's wingbeats are detected, allowing a system of the inventive subject matter to determine wingbeat frequency. Thus, each system includes at least one emitter/detector pair (though different ratios of emitters to detectors are also contemplated and described below). For detectors, photodiodes are implemented instead of phototransistors for a variety of reasons. For embodiments of the inventive subject matter, photodiodes offer improved linear response that results in a more stable system than one created using phototransistors, and they also offer lower power consumption compared to phototransistors. Photodiodes are thus more responsive to incident light, have better linear responses over a wider range of light, and can pass less current compared to phototransistors. For these reasons, embodiments of the inventive subject matter implement photodiodes instead of phototransistors (although it is still contemplated that inferior systems could be created using phototransistors). To further save on power consumption, pulse-width modulation can be implemented on both emitters and detectors such that they are synchronized to be on at the same time.

For the reasons stated above, photodiodes are more accurate than phototransistors when it comes to pest detection across a range of pest sizes. Because phototransistors have slower response times, phototransistors are not as adept at detecting, for example, smaller insects that have wingbeat frequencies of over 700 Hz.

Emitters used in embodiments of the inventive subject matter include LEDs configured to emit infrared light. IR wavelengths considered can range from 700 nm-1,400 nm. In a preferred embodiment, IR light is emitted at about 940 nm, and so a spectral response range for a photodiode acting as a detector can span 840 nm-1,100 nm. Spectral response range for a photodiode of the inventive subject matter can match that of whatever emitter is used and so ranges can also include 700 nm-1,400 nm. Some advantages to implementing IR light emission include that IR emitters consume less power than, e.g., laser emitters and that visible light can result in unwanted changes in pest behavior. Moreover, visible light can attract unwanted pests. Moreover, visible light systems can be affected by solar radiation, which introduces noise that can impede proper system function.

Embodiments of the inventive subject matter can be arranged in a variety of different ways. For example, FIG. 1 shows an annular configuration of a pest detection system 100. A set of emitters 102 are disposed on a side opposite a set of detectors 104, all of which are disposed on the same printed circuit board (PCB) 106. Although shown on a single PCB in FIG. 1, it is contemplated that PCB 106 can be separated into multiple pieces without departing from the inventive subject matter. Emitters on one side are configured to project infrared light toward the detectors such that signals generated by one or more of the detectors can be interpreted by a microprocessor to determine whether a pest has been detected. Infrared light projections are shown in FIG. 1 according to two-dimensional representations of light spread from each emitter. This visualization is given for demonstrative purposes only, as infrared light is not visible to humans.

The annular configuration can be used in embodiments intended for, e.g., fruit fly detection, pest detection system 100 can be placed within, e.g., a funnel-based fly trap. Pest detection system 100 features four emitters and 5 detectors, though there can be as little as one emitter and one detector. There is no upper limit to a number of emitters or detectors, though design and functional considerations may lead to numbers in the range of 1-20 (e.g., depending on annulus diameter, desired sensitivity, etc.). Having emitters closer to detectors as well as a higher density of emitters and detectors can improve sensitivity, which can be crucial for certain pests like small insects. Sensitivity can be improved by minimizing blind spots that would otherwise exist (e.g., a spot where a pest could pass between emitters and detectors without passing through an emission cone from one of the emitters). Because the emitters and detectors are physically closer together, (e.g., 3-10 cm, preferably around 4.5 cm), signal integrity remains high (e.g., signal intensity drops off more over longer distances compared to shorter distances). Gain and filter adjustments can be made from the default design to be more sensitive for smaller insect sizes and higher frequencies. Moreover, because emitters are closer to detectors, emitter current can be reduced.

Filtering can occur in the frequency domain by, e.g., adding a passband filter. The passband filter features a lower limit and an upper limit. The lower limit can range from 50-300 Hz and the upper limit can range from 1000-2000 Hz. In a preferred embodiment, the lower limit is about 120 Hz, and the upper limit is about 1500 Hz (+/−10% for each limit). Wingbeats of smaller insects generally fall within this range. Additional filtering in the time domain can be useful in eliminating other noise.

There is a correlation between gain and current, where light emission from an emitter is a function of current. Higher gain can amplify noise but can also improve function in systems where lower current drives one or more emitters (e.g., less light is generated). Increasing current to the emitters to generate more IR light, on the other hand, can cause issues with smaller insects because too much emitted IR light can reduce sensitivity. Systems of the inventive subject matter are configured to measure relative changes in light intensity that is received at one or more detectors that occur when pests pass between a detector and an emitter. If too much light is emitted, then detectors can become saturated, rendering them unable to detect small changes. Thus, gain and current for a given system depend on a wide variety of factors including pest size, distance between emitters and detectors, saturation level for detectors, and so on.

Figure 2:
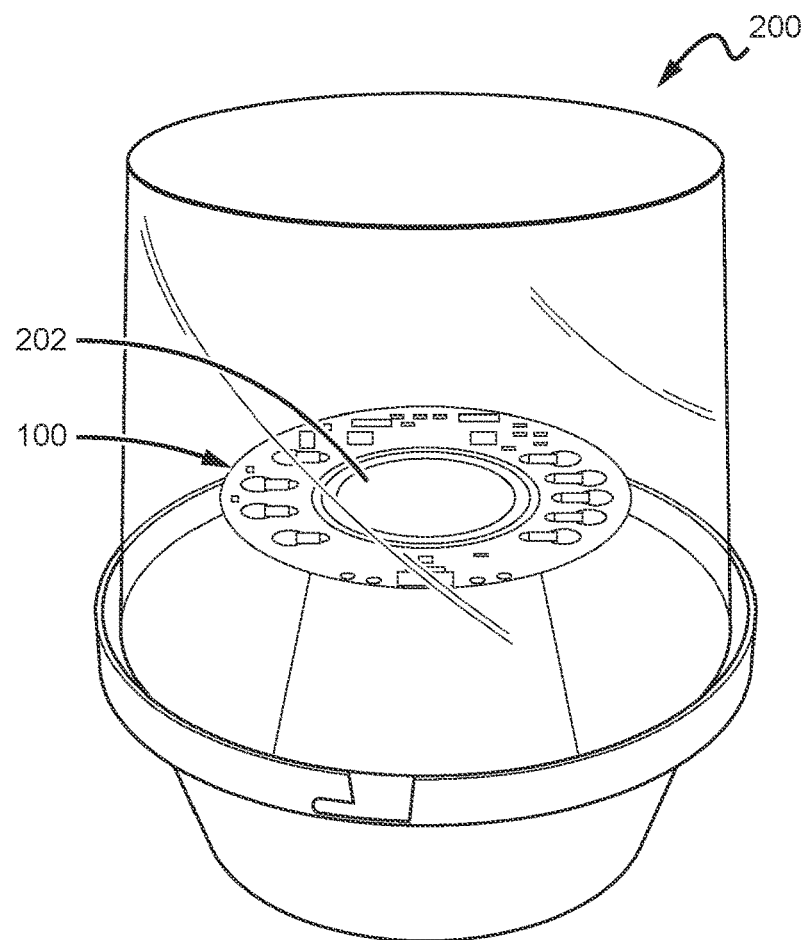
FIG. 2 shows an annular pest detection system disposed within a fly trap.
Figure 3:
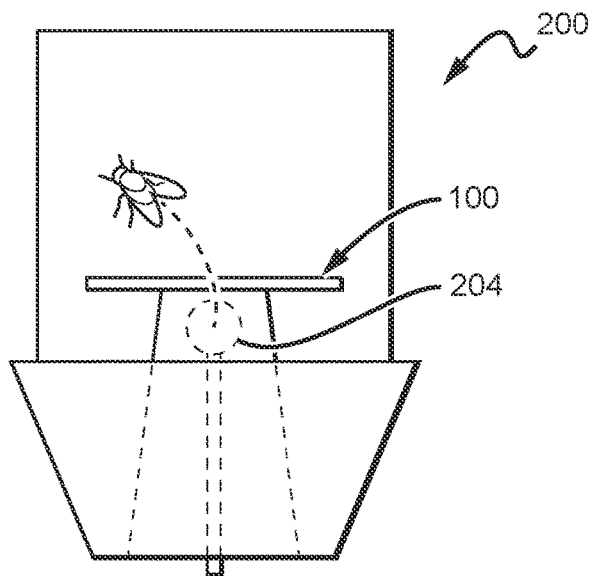
FIG. 3 shows a cutaway view of the fly trap.

As shown in FIG. 2, pest detection system 100 is shown disposed about a threshold 202 where pests (e.g., flies) enter a trap 200. Pests enter the bottom of the trap and pass across the threshold when they make their way to the interior of the trap. FIG. 3 shows a side cutaway view of trap 200 shown in FIG. 2. The cutaway view shows that trap 200 has been modified to include a landing spot 204 for, e.g., flies to land on. An issue with this type of trap configuration is that sometimes pests will walk across threshold 202 to enter trap 200 instead of flying, and because systems of the inventive subject matter rely on wingbeats to determine whether a pest is present, if a pest walks, it will not be counted. Landing spot 204 improves count accuracy by giving pests like flies a place to land just outside threshold 202 such that the pest is far more likely to fly across the threshold than to walk.

Figure 4:
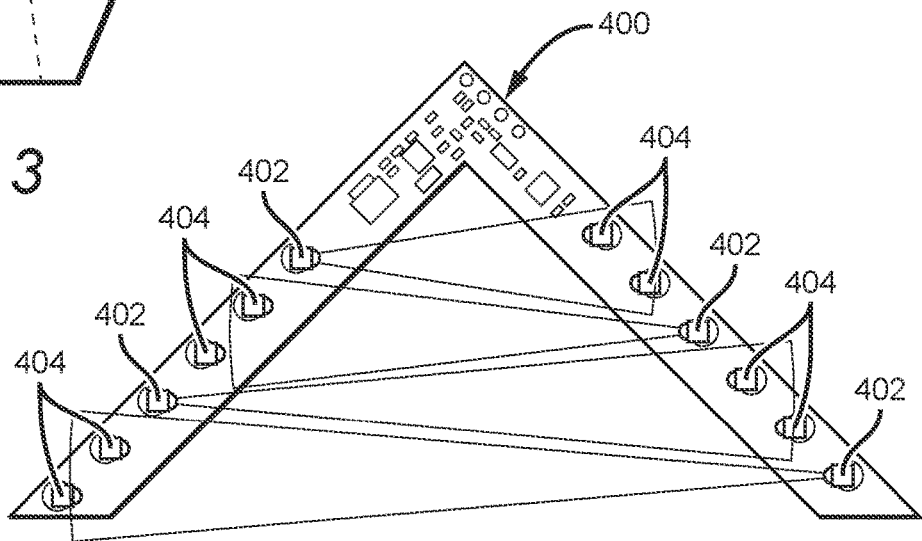
FIG. 4 shows a V-shaped pest detection system.

In another embodiment, a pest detection system can include a PCB configured into a V-shape. FIG. 4 shows pest detection system 400 having a PCB configured with a right angle, though other angles ranging from 10°-170° can be implemented without deviating from the inventive subject matter. A right-angled configuration offers a balance such that emitters 402 can be paired with detectors 404 in a way that minimizes blind spots. As shown in FIG. 4, each side of the V-shaped PCB comprises a pattern of emitter-detector-detector. Each emitter corresponds to two adjacent detectors on an opposite side of the V. Emitters can be configured to project infrared light according to, e.g., a cone, or some portion of a cone. Because each emitter sends out infrared light that projects outward, spreading away from its source, each emitter is paired with two detectors. A number of detectors paired with each emitter can vary according to, e.g., a spreading angle (e.g., an apex angle for an emitter's cone of emitted light) associated with an emitter and a distance between emitter and detectors. Each of the two detectors that is paired with a single emitter is configured to receive infrared light either primarily or only from that emitter. In some embodiments, more than two detectors are paired with a single emitter (e.g., up to 10 or more). Although there is no theoretical limit to a number of detectors per emitter, considerations such as emitter spread and distance from emitter can create practical limitations where, e.g., an emitter is incapable of projecting enough light to reach a detector with sufficient intensity or a detector rests outside of an emitter's area of projected light. As discussed above, intensity of IR light received at a detector can impact system performance.

Figure 5:
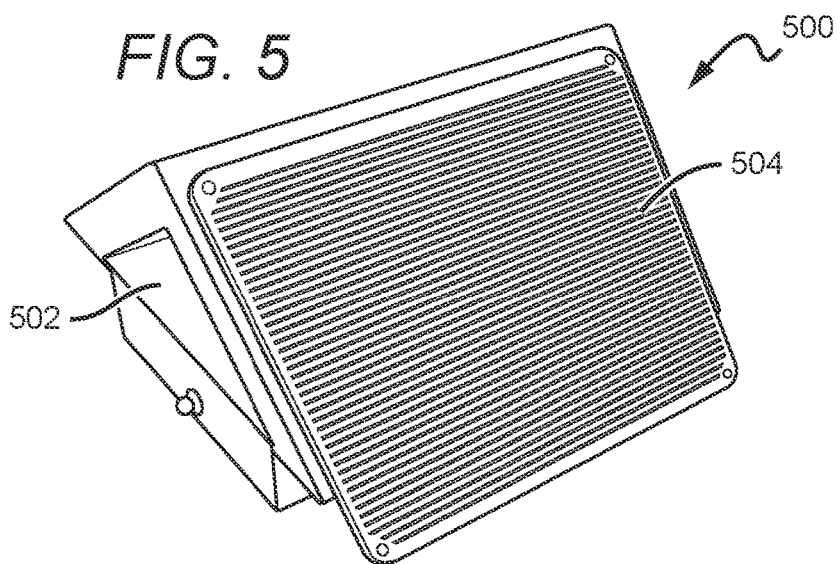
FIG. 5 shows a housing for the V-shaped pest detection system.

FIG. 5 shows an example housing 500 that can be used with V-shaped PCB (of pest detection system 400). Pests enter opening 502 on a side of housing 500, and, with V-shaped PCB disposed therein, pests fly within the V-shaped portion and between emitters/detectors. Because housing 500 is shaped with a triangular roof portion, the V-shaped PCB can be disposed such that it fits on an interior portion of the roof. In some embodiments, the V-shaped PCB is positioned near opening 502, though it can be positioned in any section desirable along the length of housing 500. An advantage of positioning the V-shaped PCB near the opening is that it is more likely for a pest to fly though the threshold of the detectors/emitters than to walk, improving accuracy. FIG. 5 also shows a solar panel 504 disposed atop the roof portion, which can optionally be used to provide power to the system.

FIG. 6 shows housing 500 from FIG. 5 disassembled. Several components are visible, including main body 506, electronics compartment 508, solar panel 504, rear panel 510, and lid 512 that covers electronics compartment 508. Electronics compartment 508 forms an interior space that is enclosed by lid 512, and it is configured to hold, e.g., batteries 514 and microprocessor 516 having sufficient I/O for the V-shaped PCB. Switch 518 and indicator LED 520 pass through walls of electronics compartment 508. Switch 518 can be configured to turn the system on or off, and indicator LED 520 can be configured to perform one or more different functions, such as turning on when the system is on, blinking on or off when a pest is counted, etc. Solar panel 504 can be affixed to either side of the roof of housing 500. In some embodiments, electronics compartment 508 can be watertight when lid 512 is attached to prevent water damage to sensitive electronics. Electronics compartment 508 can be positioned on a bottom portion of housing 500 to minimize water exposure in embodiments where electronics compartment 508 is not completely watertight. Finally, rear portion 510 is triangular in shape to match the shape of housing 500. It includes a mesh portion 522 that prevents pests from passing completely through and exiting out the other.

In some embodiments, an emitter can be paired with a detector with one or more reflective surfaces implemented to improve detection area. For example, FIG. 7 shows a pest detection system 700 having two parallel reflective surfaces—first reflective surface 702 and second reflective surface 704—that are configured as plates (e.g., extending in the z-direction assuming FIG. 7 is drawn in an x-y plane). Emitter 706 and detector 708 can be positioned at a midpoint along the height of the reflective plates. FIG. 8 shows a perspective view of PCB 710 with second reflective surface 704 coupled thereto. From this view, positioning of emitter 706 and detector 708 can be seen. In the embodiment shown in FIG. 7, emitter 706 and detector 708 are connected to the same PCB 710, with second reflective surface 704 disposed therebetween. Emitter 706 projects infrared light at an angle toward the detector, where the angle, $\theta$, can be between 10 and 80° as measured from second reflective surface 704 (preferably between 40 and 60°), and detector 708 receives that infrared light after the light has been reflected one or more times between the first reflective surface 702 and the second reflective surface 704. As shown in FIG. 7, light reflects off the first reflective surface 702 two times and once off the second reflective surface 704. Reflective surfaces of the inventive subject matter need to be able to reflect infrared light enough that it can reflect light from an emitter back to a detector at least once for a given configuration, though multiple reflections as shown in FIG. 7 do not deviate from the inventive subject matter.

Figure 9:
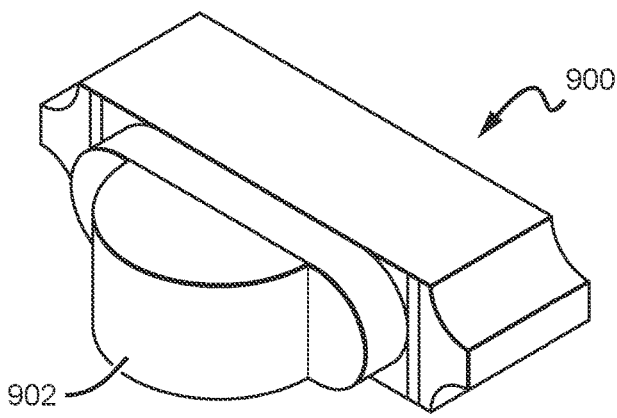
FIG. 9 shows a wide-angle emitter.

In some embodiments, a single emitter can be used in association with a set of detectors, where the emitter is specially designed to project a wider cone of infrared light than an ordinary emitter in an LED package. FIG. 9, for example, shows an emitter 900 that is configured to project a wide, flat cone of infrared light. To increase its angle of projection, emitter 900 includes a wide-angle lens portion 902.

Figure 10:
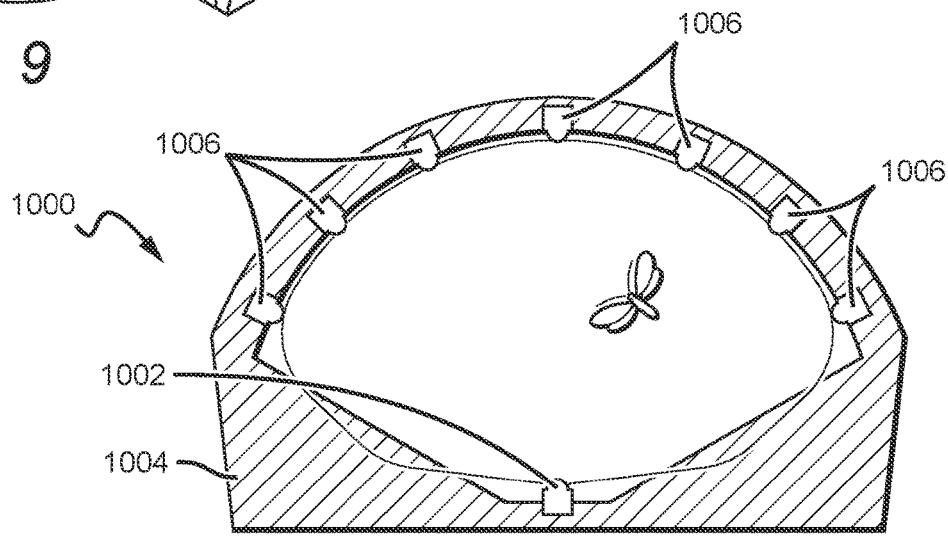
FIG. 10 shows a pest detection system implementing a wide-angle emitter.
Figure 11:
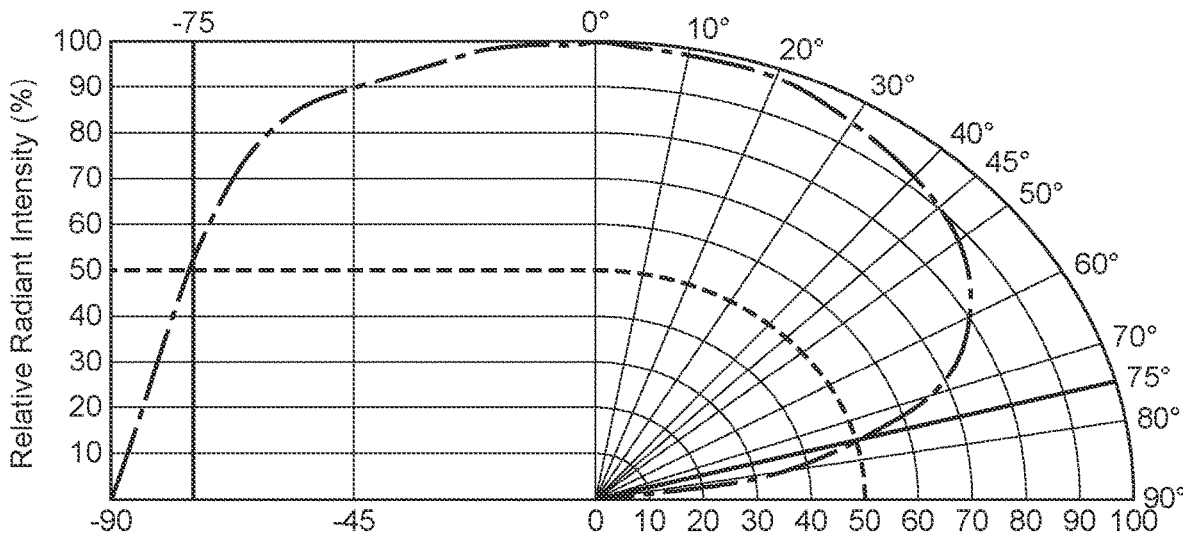
FIG. 11 shows relative radiant intensity across different angles for a wide-angle emitter.

FIG. 10 shows a pest detection system 1000 implementing a specialized emitter 1002 like the one shown in FIG. 9. PCB 1004 is shown as a single piece, though in some embodiments, the PCB portion can be in multiple pieces, as needed (e.g., one piece for the emitter and one for the detectors). In this embodiment, emitter 1002 is configured to project light according to, e.g., the graph shown in FIG. 11, which describes an emitter configured to project infrared light at sufficient intensity for pest detection across 150° (−75° to 75°). Ranges can vary according to emitter configuration. For example, an emitter in a similar package can be configured to project across a span of 180° down to 45°. Emitter 1002 thus projects infrared light out at 150°, and that light is received by detectors 1006.

To accommodate the wide projection angle (e.g., 150°) of emitter 1002, FIG. 10, shows seven detectors 1006 disposed across from emitter 1002 such that those detectors are positioned to receive light from emitter 1002. Detectors 1006 are shown evenly spaced, though this is not a requirement, and detector density can vary according to light intensity at different projection angles. Moreover, although seven detectors are shown, it is contemplated that fewer detectors can be implemented (e.g., as few as two or three), and there is theoretically no maximum to the number of detectors per emitter.

Linear density of detectors along a span of area where emitted IR light is projected can vary. A ratio of detectors to emitters can be a function of emitter angle, distance between emitters and detectors, pest size, and so on. Like emitters, detectors have angles at which incident light can be received. For example, a wide-angle receiver can detect light fluctuations caused by pests that are not directly in front of them. Where a pest crosses in front of a detector can also impact detection performance. For example, if a pest crosses near a detector, then the pest generally needs to be near the front of the detector, but if a pest crosses at a middle distance (e.g., farther from the detector than the previous example), then the detector can indicate pest presence for a broader range of positions. Because detectors essentially detect light according to cones of detection (akin to cones of projected light from emitters), it follows that if a pest is closer to a detector, the pest is nearer the cone's apex, making the area in which the pest can be detected smaller than if the pest is farther away. In some embodiments, a distance between detectors can be less than 1.5 times the size of the pest to be detected. This configuration can minimize a number of pests that are not counted that otherwise should be.

Embodiments of the inventive subject matter, as discussed above, are configured to detect the presence of pests, namely, insects. This is accomplished by shining infrared light from one or more emitters to one or more detectors. In some embodiments, some or all of the emitters and detectors are activated by pulse-width modulation (PWM). Driving emitters by PWM results in energy savings by ensuring they are only on some percent of the time instead of always on. Additionally, driving both emitters and detectors by synchronized PWM ensures that detectors are only active when emitters are generating light emissions, thus saving power.

Duty cycle parameters (e.g., duty cycle and frequency) can be static or adaptive. For example, if a system of the inventive subject matter is configured to monitor for a moth with a wingbeat frequency of 60 Hz, then a detection sampling frequency of at least 120 Hz is needed. For a detection sampling frequency of 120 Hz, there are at least 120 "on" periods and therefore a duty cycle frequency of 240 Hz should be implemented. Duty cycles of 10% to 90% can be implemented, and duty cycle percent can be dynamically changed as needed. In some embodiments, higher duty cycle (e.g., ≥50%) can be associated with lower duty cycle frequency, while lower duty cycle (e.g., ≤50%) can be associated with higher duty cycle frequency. Duty cycle frequency should be at least twice the detection sampling frequency, and the detection sampling frequency should be at least twice the wingbeat frequency of a pest to be detected. In an adaptive system, duty cycle parameters can change based on various environmental factors in an effort to detect different pests. For example, factors such as location, time of day, time of year, relative humidity, temperature, and so on, can be accounted for when setting duty cycle, because all those factors can contribute to the likelihood that a particular type of pest will be present. In static systems, a duty cycle can be set and then left unchanged. In such systems, duty cycle frequency should be set high enough to facilitate detecting pests with high wingbeat frequencies, such as fruit flies, mosquitoes, and gnats.

Adjustments to duty cycle parameters can be made by a user via software (e.g., providing input to set duty cycle or on/off ratio) or hardware (e.g., turning one or more adjustment dials to set duty cycle parameters). In some embodiments, duty cycle parameters can be adjusted as described above regarding environmental factors, though duty cycle frequency can also be adjusted by a user remotely by software. In some embodiments, duty cycle parameters can be changed according to location and current pests known to be present in that location, which can, e.g., be determined by pulling information from a database maintained by local environmental services (public or private). Dynamically defining duty cycle parameters according to pest type can improve efficiency.

Figure 12:
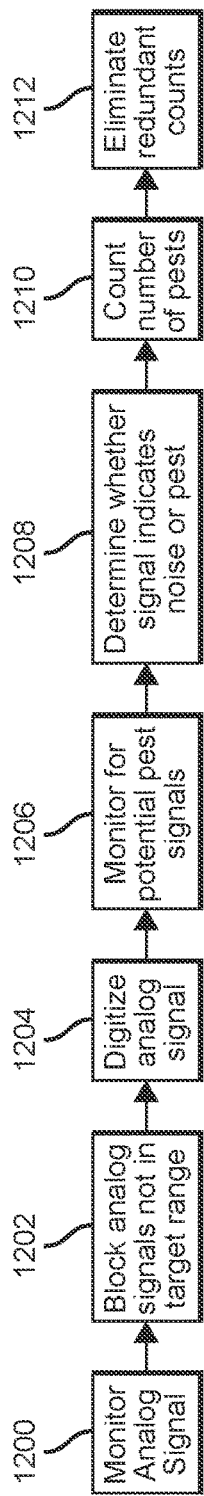
FIG. 12 is a flowchart describing how pests can be detected.

Steps shown in FIG. 12 describe how information from detectors can be used to determine whether a pest is present. In step 1200 an analog signal from a detector is monitored. Detectors of the inventive subject matter are photodiodes that generate an electrical signal (e.g., voltage, current, or both) upon receiving light. These photodiodes can be selected for sensitivity to infrared light, specifically. Thus, as emitters project infrared light, detectors receive that light and thereby generate raw analog signal.

In step 1202, analog signals that are not in a target range are largely eliminated by hardware frequency filtering, as described above, using, e.g., a passband filter. Certain frequencies or frequencies ranges blocked because pests do not typically have wingbeat frequencies in or near those ranges. For example, for moths whose wingbeat frequencies generally range from 50 to 80 Hz, hardware filtering is set to eliminate frequencies below 40 Hz and above 100 Hz, while for smaller insects like fruit flies and mosquitos whose wingbeat frequencies typically range from 200 to 1200 Hz, a bandpass filter can be implemented to eliminate frequencies below 200 Hz and above 1500 Hz. It can be desirable to keep frequencies ranging from 40 Hz up to around 1500 Hz, and all ranges therebetween are expressly contemplated in this application as being viable in embodiments of the inventive subject matter, whereby ranges can be determined based on wingbeat frequency of the type of pest to be detected. Once a range of wingbeat frequencies is known, appropriate filtering can be implemented. While bandpass filtering can be useful, in some embodiments only frequencies below a threshold value need to be eliminated, and so every lower bound described above should be interpreted as also disclosing an upper limit for a filter that removes all frequencies below that value.

After passing through a hardware filter, the signal is digitized in step 1204. With the signal digitized, a multistep filtration process can be implemented to minimize false positive pest detection while keeping processing costs down. Although these steps are described in order, some or all of the steps can be completed in an order other than how they are written. First, an analog signal from a detector is sent (e.g., continuously, as it is generated) to an analog-to-digital converter (ADC). ADCs of the inventive subject matter can have a digitization sampling frequency of, e.g., 4 kHz-10 kHz. In some embodiments, about 8 kHz is adequate for a sampling frequency.

The digitized signal is then continuously monitored for potential pest signals in step 1206. To monitor for potential pest signals, two signal amplitude threshold values are set, one high and one low. For example, it has been discovered that, when signal amplitudes are normalized to range from −1 to 1, setting the threshold values to −0.6 and 0.6 is adequate for pest detection. Normalization of amplitudes are not needed, though normalization can make systems of the inventive subject matter more robust (e.g., better able to handle detectors that output different signal amplitudes). In embodiments where normalization has not occurred, these thresholds can nevertheless be implemented by performing some basic math depending on a range of measured amplitudes for a given detector or set of detectors (e.g., where a maximum amplitude can correlate to 1 and a minimum amplitude can correlate to −1).

Figure 13:
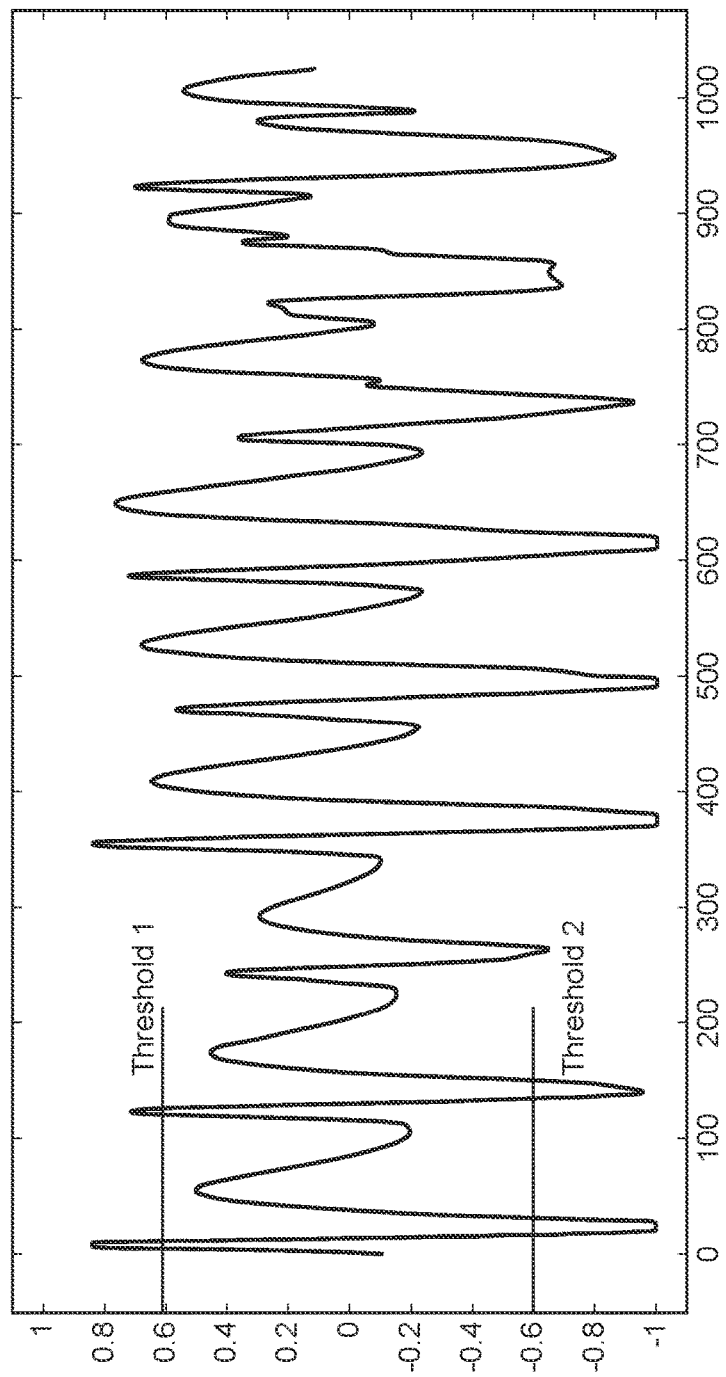
FIG. 13 shows an example signal with threshold values for detected signal amplitude.

When digital signal values from the ADC exceed either threshold value some number of times in consecutive digitized blocks (e.g., the thresholds are exceeded 2-3 consecutive times, or 2-6 consecutive times in some embodiments), that indicates that a potential pest is present. Looking for consecutive digital signal values that exceed either threshold can improve performance by eliminating false positives. Once it has been observed that digital signal values have exceeded either threshold some requisite number of consecutive times, some number of digital signal values are recorded. In some embodiments, 1024 samples are recorded, though the number of samples recorded can range from 256 to 8,192. A number of digital signal values to be recorded can vary depending on several factors, including ADC sampling rate. FIG. 13 shows an example recorded signal graphed as amplitude versus digital signal block (in this case, for a recorded sample of 1024 length). This graph shows where the digital signal values exceed a normalized amplitude threshold value (e.g., +/−0.6).

Another way to express how many digital signal values should be recorded is to state a time duration to record. Because a number of digital signal values to capture some amount of time depends on, e.g., an ADC's sampling frequency, stating an amount of time to capture can be more robust. For example, if an ADC has around an 8 kHz sampling rate, and 1024 digital signal values are recorded, that means that the system has recorded about 0.125 seconds of elapsed time. This can be expressed as follows:

$$\frac{\text{Number of digital signal values}}{ADC \text{ sampling rate (Hz)}} = \text{Elapsed time recorded}$$

Thus, an elapsed time should be in the range of 0.05-0.3 seconds (preferably around 0.125 seconds), though up to 1-3 seconds can be recorded without deviating from the inventive subject matter. These ranges for elapsed time improve a system's ability to detect pests because enough time must be captured to confirm that a pest has indeed passed by a detector and that the signal did not merely capture noise. Notably, any value for the number of recorded digital signal values should be an integer, and higher ADC sampling rates generally improve system performance, (though performance and power consumption should be balanced). If, for example, an ADC with a 4 kHz sampling rate is used, then the number of digital signal values to be recorded should be around 512.

Thus, when a recorded signal includes consecutive digital signal values that cross the threshold normalized amplitude values, that indicates a pest is present and not just some random electrical noise. Although random electrical noise can exceed a threshold, it is much less common for noise to break a threshold in two samples in a row. Nevertheless, in some cases, noise can exceed a threshold value in multiple consecutive digital signal values. Further filtering can be implemented to eliminate those types of false positives.

Figure 14:
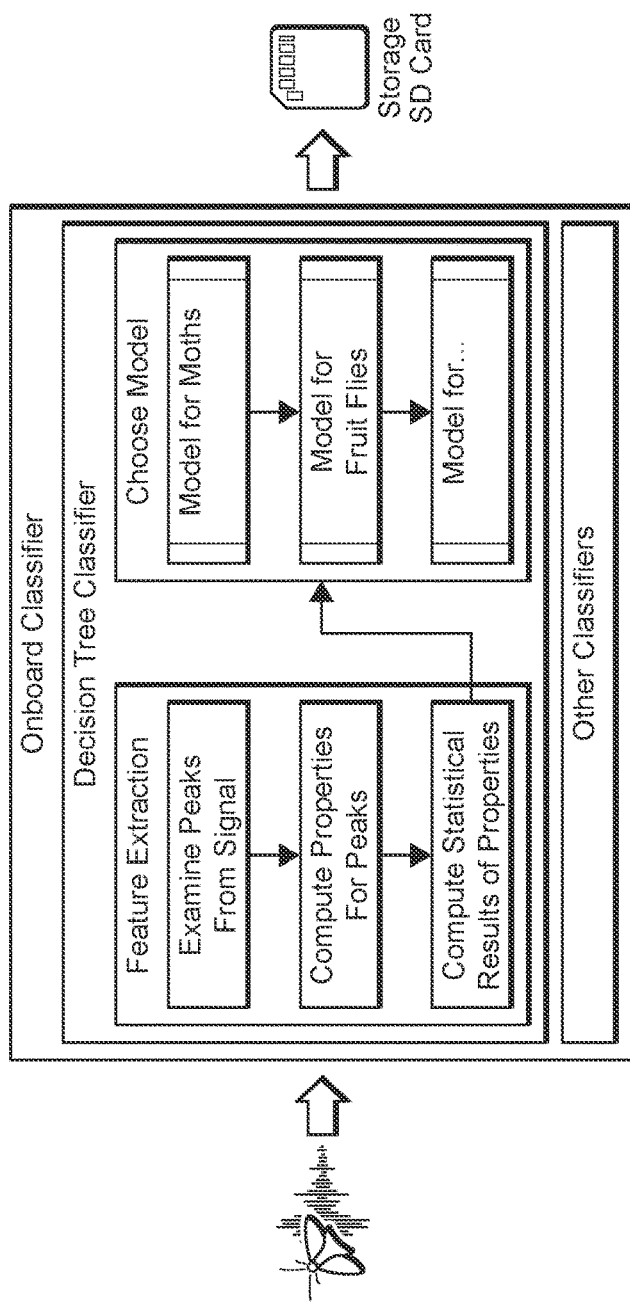
FIG. 14 shows a schematic for an onboard signal classifier.

Thus, in step 1206, the system determines whether a signal in a recorded sample indicates a pest or noise. FIG. 14 shows how this can be carried out using an onboard classifier. The onboard classifier described can be implemented as software, hardware, or as some combination of software and hardware. First, recorded samples are passed to the onboard classifier, which must choose what type of classifier to use based on, e.g., an expected pest type. Expected pest type can be determined in a variety of ways including by location, observation, and so on (as described above regarding duty cycle parameters). This involves feature extraction followed by model selection. In feature extraction, the system examines one or more peaks from the recorded signal, computes properties of those peaks, and then computes statistical results of peak properties. Next, an appropriate model is applied to determine whether a pest is present. For example, if moths are indicated as a possible pest, then a model for moths can be used to analyze the features to determine whether to count a moth. The results of this analysis are then saved to storage (e.g., whether a pest is counted, or noise is disregarded, the results are saved) and can be used to improve detection via, e.g., machine learning. Determining whether a signal indicates a pest or noise takes place in the course of step 1208. And once the results described above are saved to storage, a number of pests detected can be counted according to step 810. If any redundant counts exist, those redundancies can be eliminated according to step 812, though this step is optional, as redundancies can be eliminated throughout the process of determining the presence of pests as described above and in additional detail below.

Figure 15:
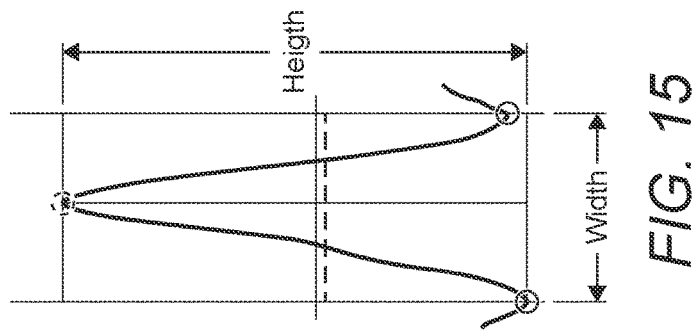
FIG. 15 shows how signal waveforms can be measured.

Classification thus involves feature extraction as described above, which is calculated within the time domain. In some embodiments, the goal of classification is to identify all peaks in the signal that exceed the upper threshold for normalized amplitude and to then combine consecutive peaks where a trough therebetween does not exceed the lower threshold. From there, peak properties are computed, which involves determining peak width. Peak width can describe a distance along the x-axis between the prior valley and the next valley of a particular peak, where units along the x-axis represent discrete digital signal values. Height is also computed, where height is measured according to signal amplitude (e.g., normalized between −1 and 1), and height for a peak is measured as units along the y-axis between a trough and a peak that is being analyzed. FIG. 15 shows how width and height are measured. Finally, sharpness can be computed, where sharpness is the height of a peak divided by its width.

Figure 16:
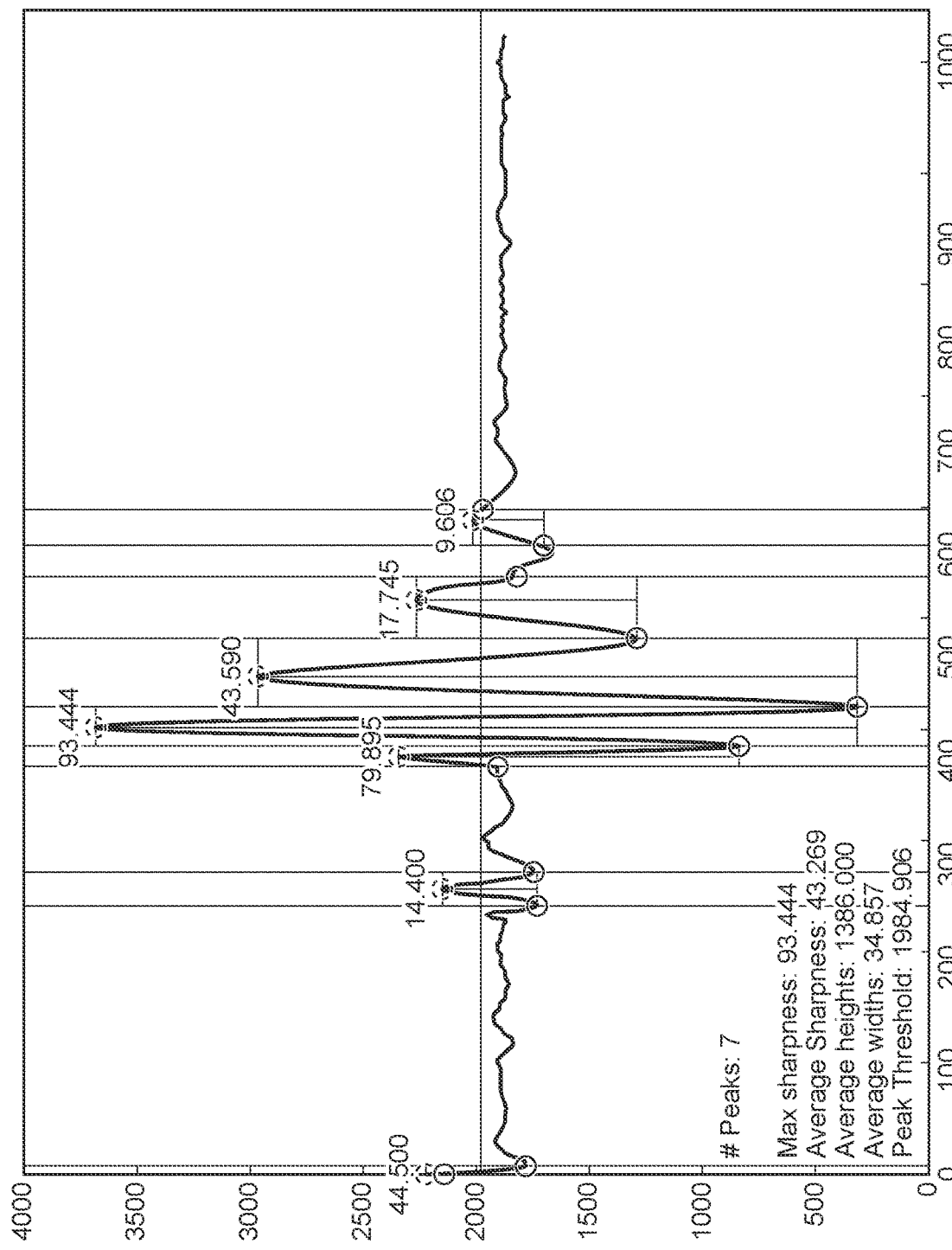
FIG. 16 shows an example signal with several measured waveforms.

Systems of the inventive subject matter can thus be configured to compute a total number of peaks in a recorded signal as well as maximum sharpness, average sharpness, maximum height, average height, maximum width, and average width. All or some of these values can be used with machine learning algorithms as, e.g., training sets to improve classification. FIG. 16 shows an example signal with different peaks notated and with max sharpness, average sharpness, average height, average width, and peak threshold notated as well. In this figure, amplitude is not normalized to fall within a range of −1 to 1.

Figure 17:
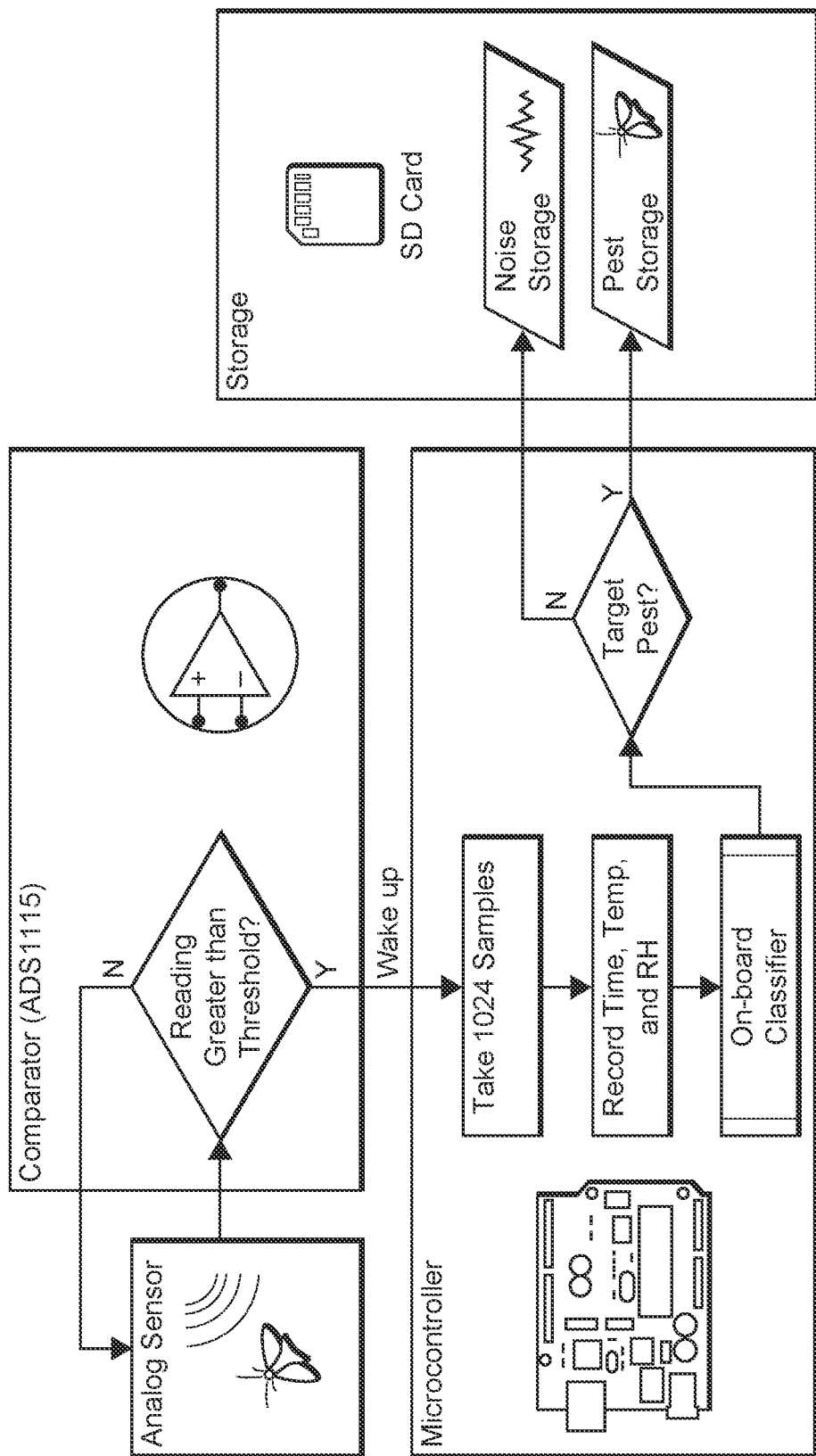
FIG. 17 shows a schematic describing how pests are by systems of the inventive subject matter.

FIG. 17 shows a system schematic, where the system shown is configured to carry out all or some of the steps described above and shown in FIG. 12. All details described above are also relevant here. The analog sensor describes the pulse-width modulated IR detectors described above. Signal from the sensor is converted from analog to digital using an ADC that samples at, e.g., 8 kHz. From there, a comparator (e.g., ADS1115) monitors for consecutive digital signal blocks that exceed an amplitude threshold. If no consecutive digital signal values are detected, then monitoring continues. When some number of consecutive digital signal values exceed an amplitude threshold (e.g., between 2 and 6, inclusive), the system wakes up and receives 1024 recorded digital signal values, also referred to as "samples" in FIG. 17. Time, temperature, and relative humidity can then be recorded, and the onboard classifier is then used to decide whether the recorded digital signal values show a pest. Humidity, time, and temperature can all be used to improve detection and can be saved with other data to, e.g., help with machine learning. When pests are found that information is stored to pest storage, and when noise is found that information is stored to noise storage. Both pest storage and noise storage can be saved to any type of computer readable medium, either locally or remotely via network connection.

Thus, specific systems and methods directed to pest detection have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of detecting pests, the method comprising:
   emitting infrared light from at least one emitter driven by a pulse-width modulated signal
   generating an analog signal based on the infrared light by using at least one detector driven by the pulse-width modulated signal;
   filtering the analog signal based on expected pest wing-beat frequencies;
   converting the analog signal to a digital signal;
   waking up a microcontroller upon detecting at least two consecutive digital signal values have exceeded a threshold value;
   recording, using the microcontroller, a series of digital signal values; and
   using an onboard classifier to determine whether the series of digital signal values indicates a pest is present.

2. The method of claim 1, wherein the threshold value comprises an amplitude or a normalized amplitude.

3. The method of claim 1, wherein the series of digital signal values comprises at least 1024 samples.

4. The method of claim 1, wherein a quantity of digital signal values in the series of digital signal values is a function of a sampling rate of an analog to digital converter and a duration of time to be recorded.

5. The method of claim 4, wherein the duration of time is between 0.05 seconds and 0.3 seconds.

6. The method of claim 1, wherein the at least one detector comprises a photodiode.

7. The method of claim 1, wherein the at least one detector is configured to detect infrared light having a wavelength of 700 nm-1,400 nm.

8. The method of claim 1, wherein the at least one emitter is configured to project infrared light having a wavelength between 700 nm-1,400 nm.

9. The method of claim 1, wherein the step of filtering comprises using a hardware bandpass filter to allow frequencies between 40 Hz and 1500 Hz to pass.

10. The method of claim 1, wherein the step of filtering comprises using a hardware bandpass filter to allow frequencies between at least one of: 40 Hz and 100 Hz; and 200 Hz and 1500 Hz.

11. A method of detecting pests, the method comprising:
emitting infrared light from at least one emitter driven by a pulse-width modulated signal;
generating an analog signal based on the infrared light by using at least one detector driven by the pulse-width modulated signal;
filtering the analog signal based on expected pest wing-beat frequencies;
converting the analog signal to a digital signal;
waking up a microcontroller upon detecting at least two consecutive digital signal values have exceeded a threshold value;
recording, using the microcontroller, a series of digital signal values;
selecting an onboard classifier based on an expected pest type;
using the onboard classifier to determine whether the series of digital signal values indicates a pest is present; and
counting a number of pests based on how many times the onboard classifier determines a pest is present.

12. The method of claim 11, wherein the threshold value comprises an amplitude or a normalized amplitude.

13. The method of claim 11, wherein the series of digital signal values comprises at least 1024 samples.

14. The method of claim 11, wherein a quantity of digital signal values in the series of digital signal values is a function of a sampling rate of an analog to digital converter and a duration of time to be recorded.

15. The method of claim 14, wherein the duration of time is between 0.05 seconds and 0.3 seconds.

16. The method of claim 11, wherein the at least one detector comprises a photodiode.

17. The method of claim 11, wherein the at least one detector is configured to detect infrared light having a wavelength of 700 nm-1,400 nm.

18. The method of claim 11, wherein the at least one emitter is configured to project infrared light having a wavelength between 700 nm-1,400 nm.

19. The method of claim 11, wherein the step of filtering comprises using a hardware bandpass filter to allow frequencies between 40 Hz and 1500 Hz to pass.

20. The method of claim 11, wherein the step of filtering comprises using a hardware bandpass filter to allow frequencies between at least one of: 40 Hz and 100 Hz; and 200 Hz and 1500 Hz.

* * * * *